US011069067B2

(12) United States Patent
Maurya et al.

(10) Patent No.: US 11,069,067 B2
(45) Date of Patent: Jul. 20, 2021

(54) SYSTEMS AND METHODS FOR PERFORMING HAND SEGMENTATION

(71) Applicant: Tata Consultancy Services Limited, Mumbai (IN)

(72) Inventors: Jitender Kumar Maurya, Gurgaon (IN); Ramya Hebbalaguppe, Gurgaon (IN); Puneet Gupta, Gurgaon (IN)

(73) Assignee: Tate Consultancy Services Limited, Mumbai (IN)

( * ) Notice: Subject to any disclaimer, the term of this patent is extended or adjusted under 35 U.S.C. 154(b) by 96 days.

(21) Appl. No.: 16/534,998

(22) Filed: Aug. 7, 2019

(65) Prior Publication Data

US 2020/0082538 A1 Mar. 12, 2020

(30) Foreign Application Priority Data

Sep. 6, 2018 (IN) .............................. 201821033598

(51) Int. Cl.
*G06T 7/00* (2017.01)
*G06T 7/12* (2017.01)
(Continued)

(52) U.S. Cl.
CPC ............... *G06T 7/12* (2017.01); *G06T 5/002* (2013.01); *G06T 5/20* (2013.01); *G06T 5/40* (2013.01);
(Continued)

(58) Field of Classification Search
CPC ... G06T 7/12; G06T 7/11; G06T 7/155; G06T 2207/30196; G06T 2207/10024;
(Continued)

(56) References Cited

U.S. PATENT DOCUMENTS 9,390,478 B2 * 7/2016 Lee ..................... G06T 5/002

OTHER PUBLICATIONS

Xin Cui et al. "Hand Segmentation in Complex Environment Based on Skin Color Model and Boundary Cutting", Jul. 15, 2012, IEEE Xplore, 2012 International Conference on Machine Learning and Cybernetics, pp. 1098-1103 (Year: 2012).*

(Continued)

*Primary Examiner* — Chan S Park
*Assistant Examiner* — Claude Noel Y Zanetsie
(74) *Attorney, Agent, or Firm* — Finnegan, Henderson, Farabow, Garrett & Dunner LLP (57) ABSTRACT

Hand segmentation on wearable devices is a challenging computer vision problem with a complex background because of varying illumination conditions, computational capacity of device(s), different skin tone of users from varied race, and presence of skin color background. The present application provides systems and methods for performing, in real time, hand segmentation by pre-processing an input image to improve contrast and removing noise/artifacts. Multi Orientation Matched Filter (MOMF) is implemented and applied on the pre-processed image by rotating the MOMF at various orientations to form an edge image which comprises strong edges and weak edges. Weak edges are further removed using morphological operation. The edge image is then added to the input image (or pre-processed image) to separate different texture region in image. Largest skin-color blob is then extracted which is considered to be correct segmented hand.

12 Claims, 7 Drawing Sheets

(51) Int. Cl.
- *G06T 5/20* (2006.01)
- *G06T 5/00* (2006.01)
- *G06T 7/155* (2017.01)
- *G06T 5/40* (2006.01)

(52) U.S. Cl.
CPC .... *G06T 7/155* (2017.01); *G06T 2207/20036* (2013.01)

(58) Field of Classification Search
CPC . G06T 2207/20036; G06T 5/002; G06T 5/20; G06T 5/40; G06T 7/10; G06T 7/13; H04N 19/17; H04N 19/182; H04N 5/142; G06K 9/00375; G06K 9/40; G06K 9/34
See application file for complete search history.

(56) References Cited

OTHER PUBLICATIONS

Mudassar et al.: "Extraction of Blood Vessels in Retinal Images Using Four Different Techniques", Nov. 18, 2013, Hindawi Publishing Corporation, Journal of Medical Engineering vol. 2013, Article ID 408120, 21 pages http://dx.doi.org/10.1155/2013/408120 (Year: 2013).*

Junxia et al.: "Hand Detection Based on Depth Information and Color Information of the Kinect", 2015, IEE Xplore, 2015 27th Chinese Control and Decision Conference (CCDC), pp. 4205-4209 ISBN:978-1-4799-7016-2 (Year: 2015).*

Emil Samuelson, "Classification of Skin Pixels in Images: Using feature recognition and threshold segmentation", spring 2018, UMEA University, Bachelor thesis, pp. 1-14 https://www.diva-portal.org/smash/get/diva2:1278777/FULLTEXT01.pdf (Year: 2018).*

Venugopola et al,: An Approach to Improvise Canny Edge Detection using Morphological Filters, Apr. 2015 International Journal of Computer Applications (0975-8887) vol. 116—No. 9, pp. 38-42 (Year: 2015).*

Qin, L. et al. "Detection of Microaneurysms in Color Retinal Images Using Multi-orientation Sum of Matched Filter," *Proceedings of 3rd International Conference on Multimedia Technology (ICMT-13)*, Guangzhou, China, Nov. 29-Dec. 1, 2013; 4 pages.

Mühlich, M. et al. (Jul. 2011). "Design and Implementation of Multi-Steerable Matched Filters," *IEEE Transactions on Pattern Analysis and Machine Intelligence,* vol. 34, No. 2; pp. 278-291.

Sofka, M. et al. (Dec. 2006). "Retinal Vessel Centerline Extraction Using Multiscale Matched Filters, Confidence and Edge Measures," IEEE Transactions on Medical Imaging, vol. 25, No. 12; pp. 1531-1546.

Vlachos, M. et al. (Jan. 2013). "A Segmentation Method Using Multiscale and Multidirectional Matched Filters Based on Dyadic Wavelet Transform for Finger Vein Pattern Extraction," *Electrical Engineering Research,* vol. 1, No. 1; pp. 1-9.

* cited by examiner

FIG. 5A (a) 0 degree

FIG. 5B (b) 30 degree

FIG. 5C (c) 90 degree

SYSTEMS AND METHODS FOR PERFORMING HAND SEGMENTATION

PRIORITY CLAIM

This U.S. patent application claims priority under 35 U.S.C. § 119 to: India Application No. 201821033598, filed on Sep. 6, 2018. The entire contents of the aforementioned application are incorporated herein by reference.

TECHNICAL FIELD

The disclosure herein generally relates to image processing techniques, and, more particularly, to systems and methods for performing real time hand segmentation on frugal head mounted device for gestural interface.

BACKGROUND

With the resurgence of Head Mounted Displays (HMDs), in-air gestures form a natural and intuitive interaction mode of communication. HMDs such as Microsoft® Hololens, Daqri smart-glasses etc., have on-board processors with additional sensors, making the device expensive. Augmented Reality (AR) devices for example, Meta Glass, and Microsoft Hololens exemplify the use of hand gestures as a popular means of interaction between computers, wearables, robots and humans. The advances in smartphone technology have introduced several low-cost, video-see-through devices such as Google Cardboard and Wearalityl that provide immersive experiences with a Virtual Reality (VR) enabled smartphone. Using the stereo-rendering of camera feed and overlaying the related information on the smartphone screen, these devices can be extended to AR and human-computer interaction (HCI).

With the advent of the above mentioned gesture recognition devices, user interactions see an evolution to gestures, speech and eye gaze from the primitive methods of interaction such as touch screen, mouse and keyboard. Frugal Google cardboard has limited interaction methods, namely, the magnetic and conductive levers, often are subjected to wear and tear. Also, these lever based interfaces are not intuitive to interact with. It is also noted that speech based commands fail in noisy environments such as oil rigs, construction industry, and automotive industry and due to varying accents. The instinctive and intuitive human to machine communication still remains a challenging task.

SUMMARY

Embodiments of the present disclosure present technological improvements as solutions to one or more of the above-mentioned technical problems recognized by the inventors in conventional systems. For example, in one aspect, there is provided a processor implemented method for performing hand segmentation and identifying a segmented hand. The method comprises obtaining an input image depicting at least a hand and background; and pre-processing the input image to obtain a pre-processed image comprising a pre-processed hand and pre-processed background. In an embodiment, the step of pre-processing the image comprises down-sampling the image to obtain a down-sampled image and applying a Contrast Limited Local Histogram Equalization (CLAHE) technique on the down-sampled image to obtain the pre-processed image. A plurality of weak edges are filtered during pre-processing of the input image by applying a Gaussian smoothing technique on the input image. Upon obtaining the pre-processed image, a Multi Orientation Matched Filter (MOMF) is applied on the pre-processed image to obtain a plurality of filter responses. The method further comprises merging the plurality of filter responses to obtain a merged filter response that comprises a plurality of strong edges and one or more weak edges; filtering the one or more weak edges formed as one or more isolated blobs from the merged filter response to obtain a resultant edge map; adding the resultant edge map to the input image (or pre-processed image) to obtain a resultant image, wherein the resultant image comprises different texture regions that are isolated from each other; detecting, using one or more chroma channels, a plurality of skin pixels from the resultant image; and identifying a largest blob of skin pixels from the resultant image, wherein the largest blob of skin pixels is a segmented hand.

In an embodiment, the Multi Orientation Matched Filter (MOMF) is applied on the pre-processed image by rotating the MOMF at one or more predefined orientations for detecting the one or more strong edges. In an embodiment, the one or more weak edges formed as one or more isolated blobs are filtered by applying a Morphological erosion technique on the merged filter response.

In another aspect, there is provided a system for performing hand segmentation and identifying a correct segmented hand. The system comprises a memory storing instructions; one or more communication interfaces; and one or more hardware processors coupled to the memory via the one or more communication interfaces, wherein the one or more hardware processors are configured by the instructions to: obtain an input image depicting at least a hand and background; pre-process the input image to obtain a pre-processed image comprising a pre-processed hand and pre-processed background. In an embodiment, the input image is pre-processed by down-sampling the image to obtain a down-sampled image; and applying a Contrast Limited Local Histogram Equalization (CLAHE) technique on the down-sampled image to obtain the pre-processed image. In an embodiment, during pre-processing of the input images a plurality of weak edges are filtered by applying a Gaussian smoothing technique on the input image. The hardware processors are further configured by the instructions to apply a Multi Orientation Matched Filter (MOMF) on the pre-processed image to obtain a plurality of filter responses; merge the plurality of filter responses to obtain a merged filter response that comprises a plurality of strong edges and one or more weak edges; and filter the one or more weak edges formed as one or more isolated blobs from the merged filter response to obtain a resultant edge map. In an embodiment, the Multi Orientation Matched Filter (MOMF) is applied on the pre-processed image by rotating the MOMF at one or more predefined orientations for detecting the one or more strong edges. In an embodiment, the plurality of weak edges formed as one or more isolated blobs are filtered by applying a Morphological erosion technique on the merged filter response. The resultant edge map is added to the input image (or pre-processed image) to obtain a resultant image, wherein the resultant image comprises different texture regions that are isolated from each other; and a plurality of skin pixels are detected from the resultant image using one or more chroma channels. A largest blob of skin pixels identified from the resultant image which is a segmented hand.

In yet another aspect, there are provided one or more non-transitory machine readable information storage mediums comprising one or more instructions which when executed by one or more hardware processors causes a method for performing hand segmentation and identifying a correct segmented hand. The instructions causes obtaining an input image depicting at least a hand and background; and pre-processing the input image to obtain a pre-processed image comprising a pre-processed hand and pre-processed background. In an embodiment, the step of pre-processing the image comprises down-sampling the image to obtain a down-sampled image and applying a Contrast Limited Local Histogram Equalization (CLAHE) technique on the down-sampled image to obtain the pre-processed image. A plurality of weak edges are filtered during pre-processing of the input image by applying a Gaussian smoothing technique on the input image. Upon obtaining the pre-processed image, a Multi Orientation Matched Filter (MOMF) is applied on the pre-processed image to obtain a plurality of filter responses. The instructions further cause merging the plurality of filter responses to obtain a merged filter response that comprises a plurality of strong edges and one or more weak edges; filtering the one or more weak edges formed as one or more isolated blobs from the merged filter response to obtain a resultant edge map; adding the resultant edge map to the input image (or pre-processed image) to obtain a resultant image, wherein the resultant image comprises different texture regions that are isolated from each other; detecting, using one or more chroma channels, a plurality of skin pixels from the resultant image; and identifying a largest blob of skin pixels from the resultant image, wherein the largest blob of skin pixels is a segmented hand.

In an embodiment, the Multi Orientation Matched Filter (MOMF) is applied on the pre-processed image by rotating the MOMF at one or more predefined orientations for detecting the one or more strong edges. In an embodiment, the one or more weak edges formed as one or more isolated blobs are filtered by applying a Morphological erosion technique on the merged filter response.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Currently existing method(s) use deep learning based method(s) to perform hand segmentation, which require additional resources for example, server. While there are few other methods which perform hand segmentation using depth send and RGB based techniques which are not accurate when there exists skin like background.

Hand segmentation is a necessary step for interpreting air-gestures. Use of these frugal headsets is encouraged with a smartphone for AR applications because of its economic viability nature, portability and scalability to the mass market.

Many applications proposed in researches incorporate additional wearable sensors and may require specific training for users. It is also noted that there have been very few attempts for hand segmentation on-board on Google cardboard with a smartphone. The possible applications are: (a) gesture recognition in HMD (b) video games in AR/VR mode (c) hand pose detection. However, prior researches and works fail to accurately perform hand segmentation which may be due to inaccurate capture of gestures, external factors for instance, nature of environment, and like.

Hand in-air gestures form a dominant mode of input for HCl and it is shown that they are usually preferred over touch based system. One of the most widely accepted examples of hand gestures recognition is data glove. Enhancement of hand segmentation has replaced the role of data gloves to bare hands due to its naturalness. Hand segmentation on wearable devices is a challenging computer vision problem with a complex background because of the following reasons: (a) varying illumination conditions, (b) computational capacity of device, (c) different skin tone of users from varied race, and (d) presence of skin color background. Few researches have used camera and IR LEDs to detect hand, which some have proposed using body-worn cameras and diffused IR illumination, and depth information for hand segmentation. The approaches discussed above require extra hardware, body-worn cameras, user instrumentation or external tracking, and often off-board processing as well. There are few other works that utilize random forest like classifiers and Gaussian mixture model for hand segmentation. However, these approaches take a lot of time to process each frame and pose serious barriers for user adoption. Embodiments of the present disclosure design and implement a filter for efficient hand segmentation in the wild and demonstrates using a combination with histogram equalization, Gaussian blurring. The present disclosure circumvent the shortcomings of the hand segmentation as discussed above and also takes care of First-person view (FPV) constraints caused due to wearable devices.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

Figure 1:
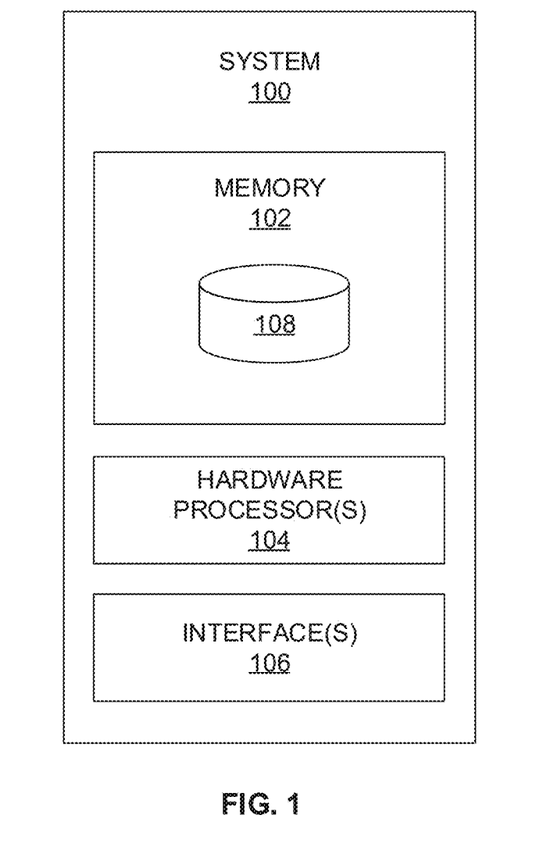
FIG. 1 illustrates an exemplary block diagram of a system for performing hand segmentation and identifying a correct segmented hand in accordance with an embodiment of the present disclosure.

FIG. 1 illustrates an exemplary block diagram of a system 100 for performing hand segmentation and identifying a correct segmented hand in accordance with an embodiment of the present disclosure. The system 100 may also be referred as 'a hand segmentation system' or 'a segmentation system' and interchangeably used hereinafter. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise, but are not limited to information hand and background, down-scaling output, filtered output(s), correct segmented hand output, and the like. More specifically, information pertaining to input image comprising hand, skin like background, and the like. In an embodiment, the memory 102 may store one or more technique(s) (e.g., filtering technique(s), one or more filters) which when executed by the one or more hardware processors 104 to perform the methodology described herein. The memory 102 may further comprise information pertaining to input(s)/output(s) of each step performed by the systems and methods of the present disclosure.

Figure 2:
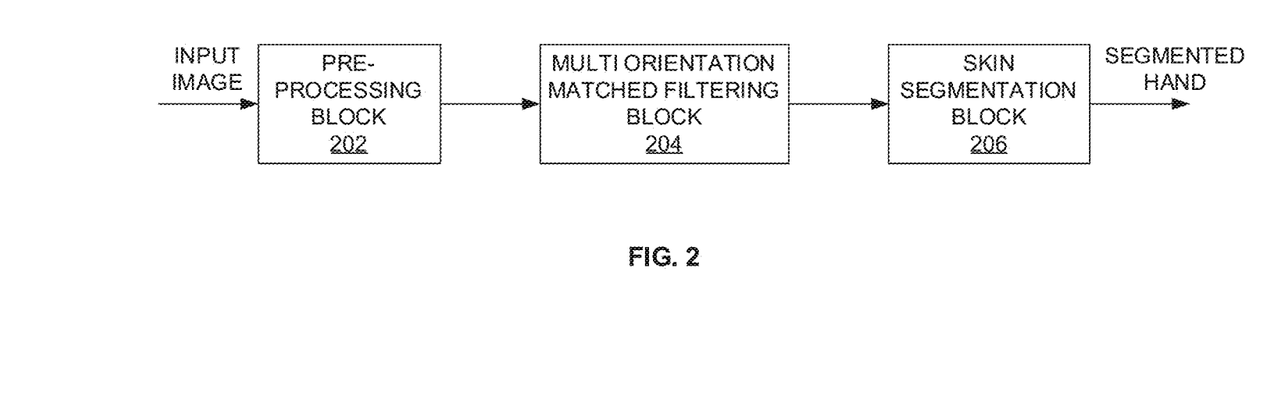
FIG. 2 illustrates an exemplary block diagram of the hand segmentation system of FIG. 1 in accordance with an example embodiment of the present disclosure.

FIG. 2, with reference to FIG. 1, illustrates an exemplary block diagram of the hand segmentation system 100 of FIG. 1 in accordance with an example embodiment of the present disclosure. The hand segmentation system 100 includes a pre-processing block 202, a Multi Orientation Matched Filtering (MOMF) block 204, and a skin segmentation block 206.

Figure 3:
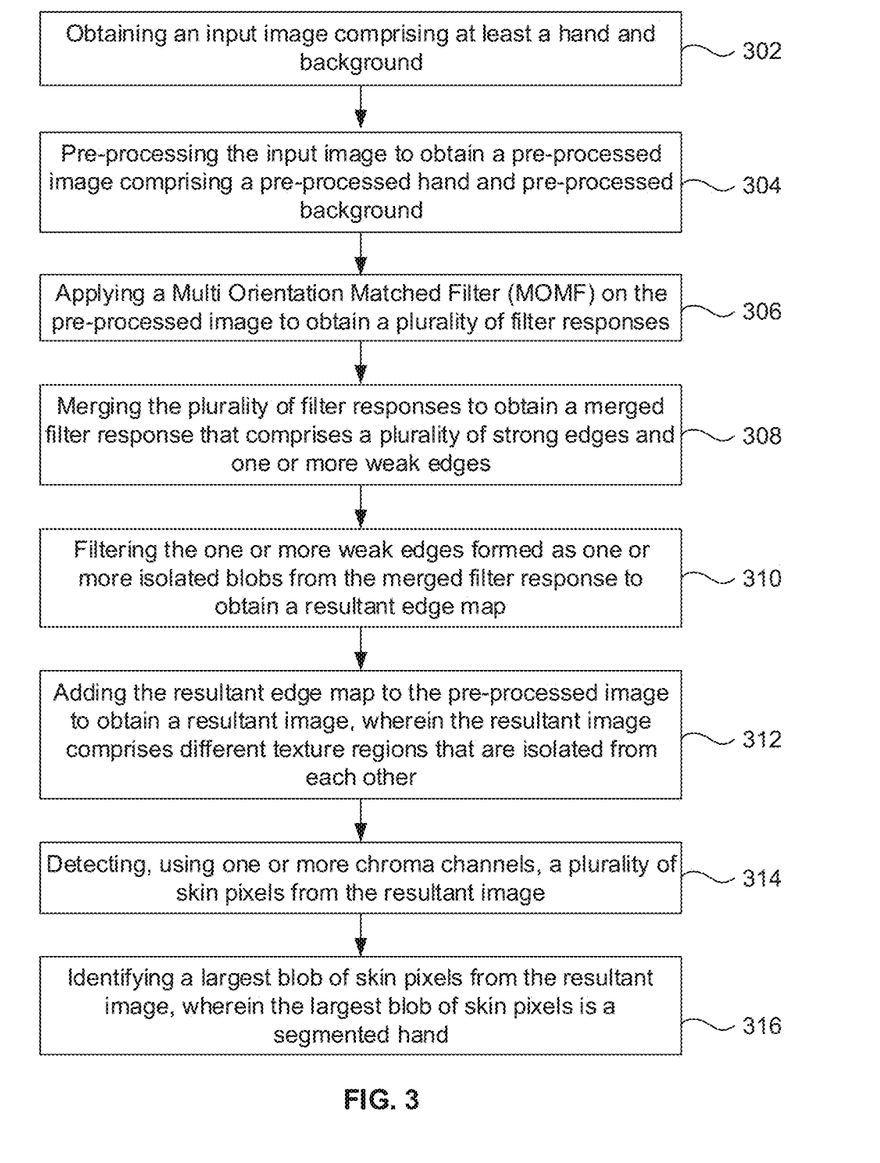
FIG. 3 illustrates an exemplary flow diagram of a method for performing hand segmentation and identifying a segmented hand using components of the hand segmentation system of FIGS. 1-2 in accordance with an embodiment of the present disclosure.

FIG. 3, with reference to FIGS. 1-2, illustrates an exemplary flow diagram of a method for performing hand segmentation and identifying a correct segmented hand using the system 100 and components of the hand segmentation system of FIGS. 1-2 in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the block diagram as depicted in FIG. 2. In an embodiment of the present disclosure, at step 302, the one or more hardware processors 104 obtain an input image depicting at least a hand and a background. In an embodiment, the background may comprise skin like background. In an embodiment of the present disclosure, at step 304, the one or more hardware processors 104 pre-process the input image to obtain a pre-processed image comprising a pre-processed hand and pre-processed background. In an embodiment, the input image is pre-processed by down-sampling it first to obtain a down-sampled image and then a Contrast Limited Local Histogram Equalization (CLAHE) technique is applied on the down-sampled image to obtain the pre-processed image. The purpose of pre-processing is to improve contrast and remove noise. For instance, in the present disclosure the input image (or input image frames) was obtained from an image capturing device (e.g., say smartphone rear camera) which was then down-scaled or down-sampled to a resolution of 640×480, in order to reduce the processing time and that too without compromising much on image quality. Subsequently, Contrast Limited Local Histogram Equalization (CLAHE) technique was applied to the down-sampled image for improving the global contrast and mitigating illumination artifacts. In an embodiment of the present disclosure, the input image was pre-processed in the pre-processing block 202 as depicted in FIG. 2.

Figure 4A:
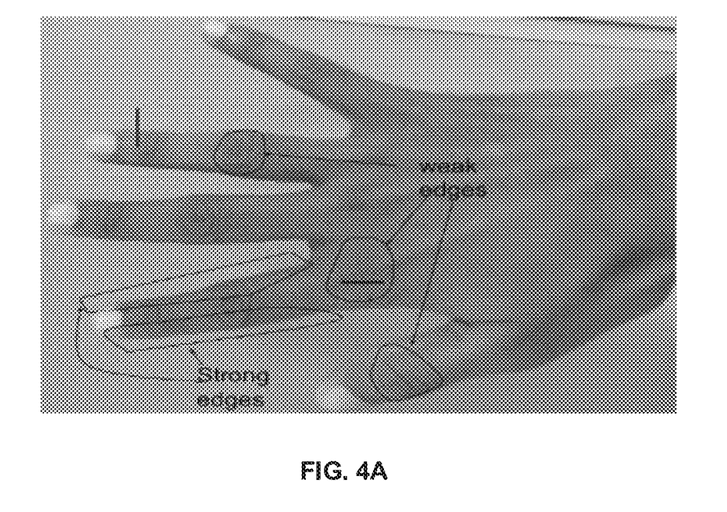
FIG. 4A depicts a hand with a plurality of strong edges and a plurality of weak edges in accordance with an embodiment of the present disclosure.
Figure 4B:
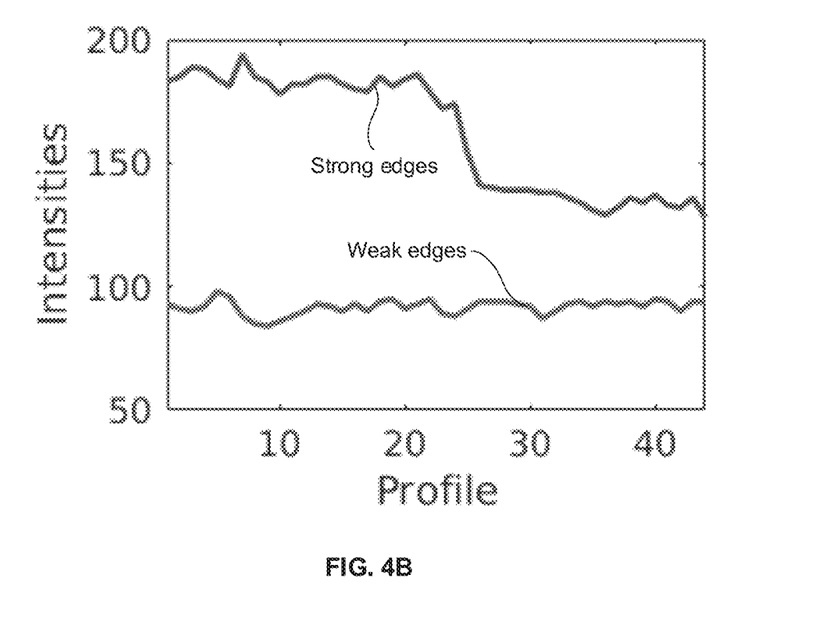
FIG. 4B depicts a graphical representation illustrating a profile of the plurality of strong edges and the plurality of weak edges in accordance with an embodiment of the present disclosure.

FIG. 4A, with reference to FIGS. 1 through 3, depicts a hand with a plurality of strong edges and a plurality of weak edges in accordance with an embodiment of the present disclosure. FIG. 4B, with reference to FIGS. 1 through 4, depicts a graphical representation illustrating a profile of the plurality of strong edges and the plurality of weak edges in accordance with an embodiment of the present disclosure. The present disclosure considers two kinds of edges in hand images, viz., weak and strong edges. Weak edges are generated due to surface color discontinuity thus these consist of uniform texture. In contrast, strong edges are generated by the depth discontinuity hence these contain significant texture and color variations. For visualization (as depicted in FIG. 4A). To mitigate the weak edges, Gaussian smoothing technique is applied to a histogram equalized image. In other words, a plurality of weak edges are filtered during pre-processing of the input image by applying a Gaussian smoothing technique on the input image. It is observed that the smoothing can slightly impact the strong edges, but most the intensity variations is being preserved.

In an embodiment of the present disclosure, at step 306, the one or more hardware processors 104 apply a Multi Orientation Matched Filter (MOMF) on the pre-processed image to obtain a plurality of filter responses and merge the plurality of filter responses to obtain a merged filter response at step 308. In an embodiment the merged filter response comprises a plurality of strong edges and one or more weak edges. More specifically, the Multi Orientation Matched Filter (MOMF) is applied on the pre-processed image by rotating the MOMF at one or more predefined orientations for detecting the one or more strong edges. MOMF orientations can be visualized in FIGS. 5A through 5C. Design and implementation of the MOMF as executed by the present disclosure is described below:

Multi Orientation Matched Filter (MOMF):

As discussed above, color based hand segmentation often fails to correctly distinguish the hand from the background containing skin-like pixel intensities. Hence, to detect the strong edges the present disclosure implements and executes the MOMF for correct hand segmentation. An example depicting the behavior of weak and strong edges, is illustrated in FIG. 4B as mentioned above. It can be seen from FIG. 4B that the pattern formed by the strong edges closely resembles a sigmoid function in the cross-sectional profile while line shaped pattern in the tangential profile. Hence, the MOMF was designed which approximates the sigmoid function in cross-sectional profile while line in the tangential profile. Such a filter, $G_\theta$, of size $(2n+1)\times(2m+1)$ is given by:

$$G_\theta(x, y) = \frac{1}{2} - \frac{1}{1 + e^{\frac{-p}{c}}} \quad (1)$$

where $G_\theta(x,y)$ represents the value of the filter $G_\theta$ at the location $(x,y)$; $\theta$ denotes the orientation of filter; c provides the scaling in filter; while p handle the orientation and is given by:

$$p = x \cos\theta + y \sin\theta \quad (2)$$

$-n \leq x \leq n, -m \leq y \leq m$

Figure 5A:
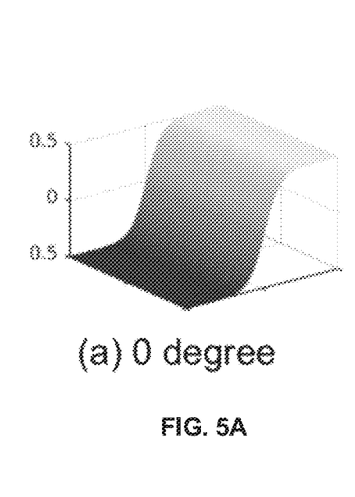
FIG. 5A depicts a Multi Orientation Matched Filter orientation at 0 degree in accordance with an example embodiment of the present disclosure.
Figure 5B:
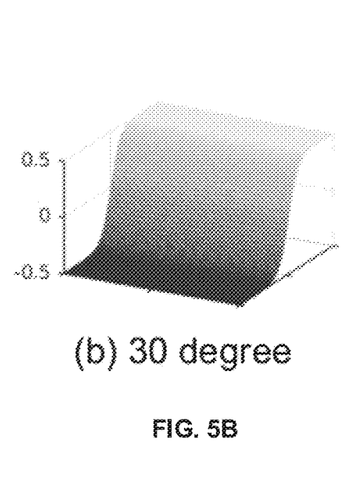
FIG. 5B depicts the Multi Orientation Matched Filter orientation at 30 degree in accordance with an example embodiment of the present disclosure.
Figure 5C:
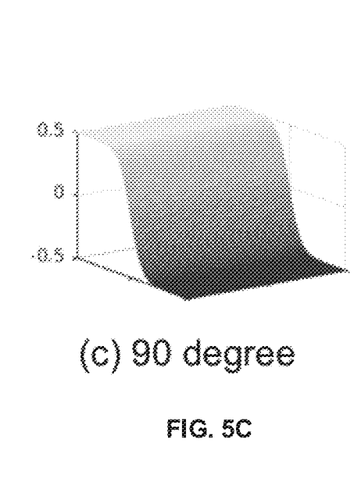
FIG. 5C depicts the Multi Orientation Matched Filter orientation at 90 degree in accordance with an example embodiment of the present disclosure.
Figure 6A:
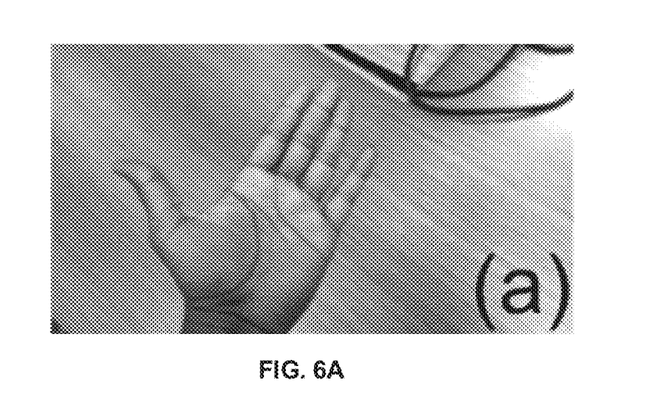
FIGS. 6A through 6B depict a Multi Orientation Matched Filter (MOMF) response on skin-like background in accordance with an example embodiment of the present disclosure.
Figure 6B:
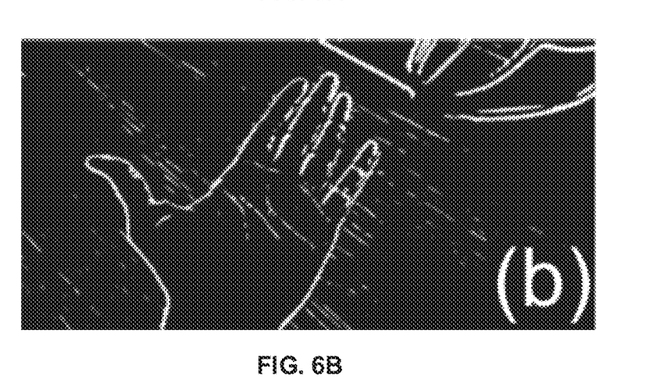

The MOMF at different orientations, $\theta$ can be visualized from FIGS. 5A through 5C. More specifically, FIG. 5A depicts a Multi Orientation Matched Filter orientation at 0 degree in accordance with an example embodiment of the present disclosure. FIG. 5B depicts the Multi Orientation Matched Filter orientation at 30 degree in accordance with an example embodiment of the present disclosure. FIG. 5C depicts the Multi Orientation Matched Filter orientation at 90 degree in accordance with an example embodiment of the present disclosure. It can be observed that the MOMF of the present disclosure is defined such that its mean is zero, hence it can only provide the strong edge information oriented in the direction $\theta$. Since strong edges are present at multiple orientations, the MOMF of the present disclosure is applied at different fixed orientations. Hence the filter is termed MOMF. Multiple filter responses are obtained by applying the oriented matched filters on the pre-processed image and the final response at a pixel is given by the maximum filter response. Mathematically, the final filter response, R is given by:

$$R(x, y) = \max_{\theta \in \Theta} (G_\theta(x, y) \circledast I(x, y)) \quad (2)$$

where and $\theta$ represent convolution operator and set of orientation respectively. For visualization, consider FIGS. 6A-6B which depict the input image and the corresponding R respectively. It can be seen that R contains high values at the strong edges and low values for the background and weak edges. More specifically, FIGS. 6A through 6B, with reference to FIGS. 1 through 5C, depict a Multi Orientation Matched Filter (MOMF) response on skin-like background in accordance with an example embodiment of the present disclosure. The steps 306 and 308 are executed in the MOMF block 204 of FIG. 2.

As can be seen from FIGS. 6A through 6B, though weak edges were removed by applying Gaussian smoothing technique on the input image during pre-processing stage some of the weak edges are still present in the final filter response (also referred as the merged filter response) in the form of isolated blobs. In order to filter the remaining weak edges, the present disclosure employs Morphological erosion technique. More specifically, in an embodiment of the present disclosure, at step 310, the one or more hardware processors 104 filter the one or more weak edges formed as one or more isolated blobs from the merged filter response to obtain a resultant edge map. The one or more weak edges formed as one or more isolated blobs are filtered or removed by applying the Morphological erosion technique on the merged filter response.

In an embodiment of the present disclosure, at step 312, the one or more hardware processor 104 add the resultant edge map to the pre-processed image to obtain a resultant image. The resultant image comprises different texture regions that are isolated from each other, in one example embodiment. In other words, the resultant edge map is added to original image (or pre-processed image), I using:

$$\bar{I} = \max(R(x,y) \oplus I, 255) \quad (4)$$

where $\oplus$ and max denote the pixel-wise addition and max operator respectively. Due to the pixel-wise addition, the resultant image $\bar{I}$ contains higher values at the locations of strong edges and they lie outside the range of skin color. The skin pixels are detected from the $\bar{I}$ using color segmentation technique known in the art. More specifically, at step 314, the one or more hardware processor 104 detecting, using one or more chroma channels, a plurality of skin pixels from the resultant image. In other words, the system 100 utilizes only the chroma channels ($C_b$ and $C_r$) for the detection because they exhibit better clustering of skin pixels and uni-modal distribution. The threshold values for the chroma channels are: $77 < C_b < 127$ and $133 < C_r < 173$, in one example embodiment.

Figure 6C:
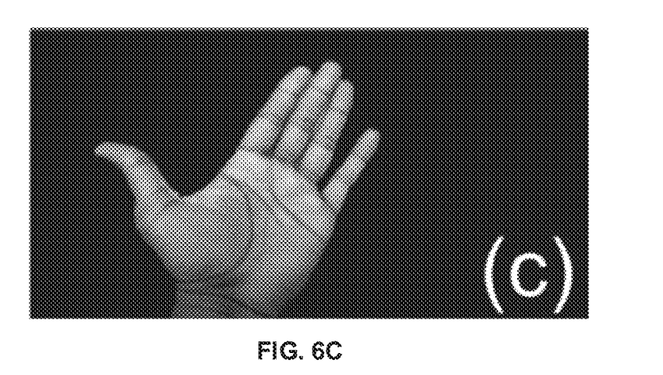
FIG. 6C depicts a correct segmented hand corresponding to the hand comprised in an input image as depicted in FIG. 6A in accordance with an embodiment of the present disclosure.

It has been observed that skin filter (e.g., the color segmentation technique known in the art) can introduce noisy blobs, when there exists skin-like pixels in the background. To handle the problem of misinterpreting these skin-like background blobs as hand pixels, the present disclosure retains only the largest blob. It is based on the assumption that the hand region would be the most prominent object in the FPV when gestures are performed on HMD. The largest blob is determined using a contour tracing technique (e.g., a technique known in the art). More specifically, at step 316, the one or more hardware processor 104 identify a largest blob of skin pixels from the resultant image. This largest blob of skin pixels is a segmented hand (also referred as 'correct segmented hand'). The steps 310 and 316 are executed in the skin segmentation block 206 of FIG. 2, in one example embodiment. In an embodiment of the present disclosure, the expression 'skin segmentation block 206' may also be referred as 'hand segmentation block 206' and may be interchangeably used herein. An example of hand segmentation is shown in FIG. 6C. More particularly, FIG. 6C, with reference to FIGS. 1 through 6B, depicts a correct segmented hand corresponding to the hand comprised in the input image as depicted in FIG. 6A in accordance with an embodiment of the present disclosure.

Results

Experimental Set-Up:

The experiments were performed on XIAOMI REDMI Note 3, equipped with Qualcomm MSM8956 Snapdragon 650 chipset, hexa-core CPU (4×1.4 GHz Cortex-A53 & 2×1.8 GHz Cortex-A72), Adreno 510 GPU and runs Android 5.1.1. Total 484 hand images were acquired from this android under varying illumination conditions. These belong to 31 different subjects—18 male and 13 female. To test the efficacy of the method of the present disclosure, images in the dataset contain challenging background, i.e., the background contain skin-like intensities were considered. For more rigorous performance evaluation, the method of the present disclosure was tested on two publicly available datasets, viz., G1-G7 (e.g., refer 'Jie Song, G'abor S¨or ¨os, Fabrizio Pece, Sean Ryan Fanello, Shahram Izadi, Cem Keskin, and Otmar Hilliges, "In-air gestures around unmodified mobile devices," in Proceedings of the 27th annual ACM symposium on User interface software and technology. ACM, 2014, pp. 319-329.') and Egocentric Hand segmentation dataset (e.g., refer 'Lorenzo Baraldi, Francesco Paci, Giuseppe Serra, Luca Benini, and Rita Cucchiara, "Gesture recognition in ego-centric videos using dense trajectories and hand segmentation," in Proceedings of the IEEE Conference on Computer Vision and Pattern Recognition Workshops, 2014, pp. 688-693.').

Implementation Details:

The filter (MOMF) response contains a small number of weak edges that are reduced if the filter size and number of orientations are sufficiently large. But large size of filter results in poor hand localization while large number of orientation results in increase of computational. After experiments, it was found that filter size and number of orientations, $\Theta$ should be set to 15×15 and 16 respectively for correct hand segmentation. $\Theta$ was set to be a multiple of $\pi/16$.

Hand Segmentation Accuracy:

The present disclosure employed Jaccard index to evaluate the hand segmentation accuracy using:

$$J(S, G) = \frac{(S \cap G)}{(S \cup G)} \quad (5)$$

where S is the segmented image and G is ground truth image. Correct segmentation refers to the case where the Jaccard index, J is greater than 0.95. A higher threshold was chosen on J because large part of hand is usually required for gesture recognition in AR. It is observed that the method of the present disclosure can correctly segment 444 images report, while conventional technique 1 (e.g., Morerio et al.—refer Pietro Morerio, Lucio Marcenaro, and Carlo S Regazzoni, "Hand detection in first person vision," in Information Fusion (FUSION), 2013 16th International Conference on. IEEE, 2013, pp. 1502-1507.') can correctly segment only 326 images. Moreover, the average Jaccard index of the method of the present disclosure is significantly better than that of the above convention technique 1 (e.g., Morerio et al.)

Figure 7:
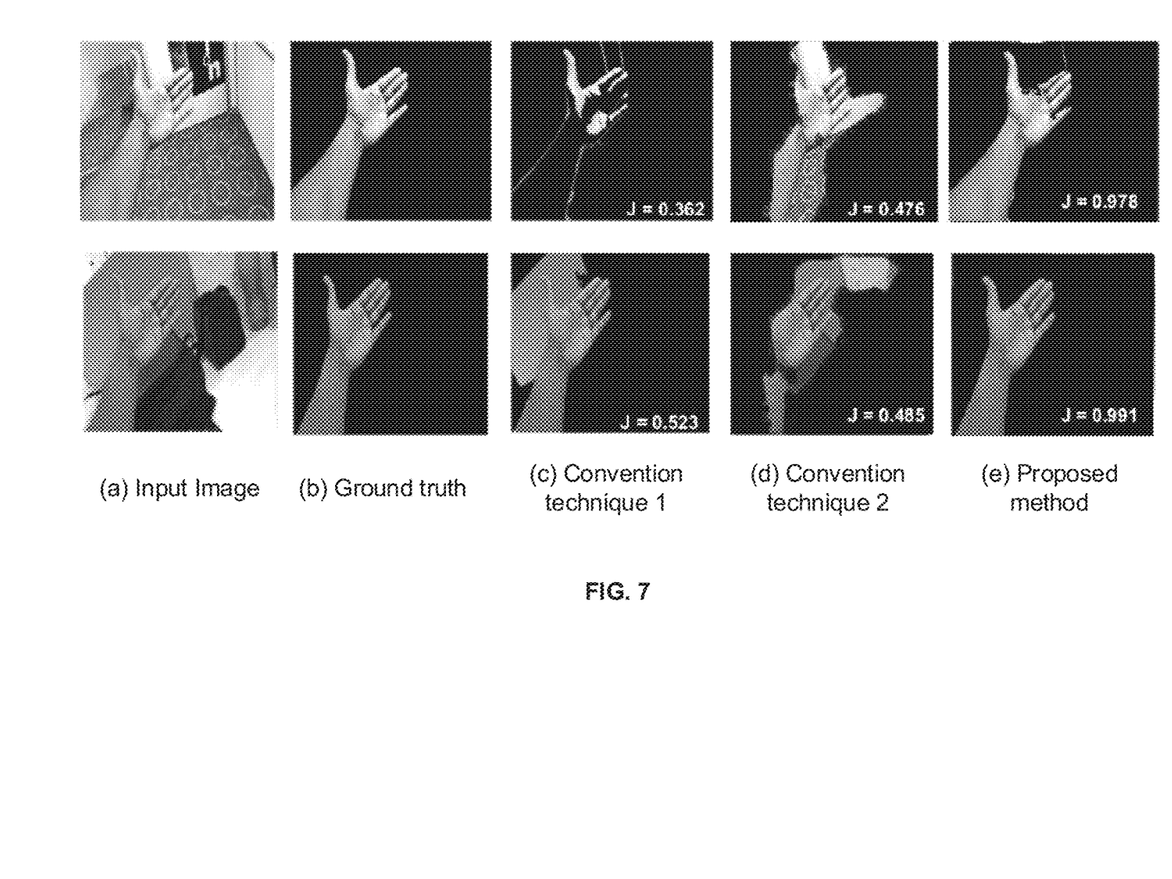
FIG. 7 depicts results of hand segmentation of the present disclosure in comparison with $YC_bC_r$ proposed by conventional techniques in accordance with an example embodiment of the present disclosure.

The experimental results performed on the publicly available datasets are shown in below table (e.g., Table 1) and FIG. 7. More specifically, FIG. 7, with reference to FIGS. 1 through 6C, depicts hand segmentation results of the present disclosure in comparison with $YC_bC_r$ proposed by conventional technique 1 (depicted in (c) of FIG. 7) and conventional technique 2 (e.g., refer 'Vijay Badrinarayanan, Alex Kendall, and Roberto Cipolla, "Segnet: A deep convolutional encoder decoder architecture for image segmentation," IEEE Transactions on Pattern Analysis and Machine Intelligence, 2017.') as depicted in (d) of FIG. 7). FIG. 7 also includes an input image depicted in (a) of FIG. 7, and ground truth depicted in (b) respectively.

The table (e.g., Table 1) uses Jaccard index metrics to depict the performance evaluation. The method of the present disclosure is also compared with the convention technique 2, which is based on deep learning and extensively used for pixel-wise segmentation.

TABLE 1

| | Datasets | | | |
|---|---|---|---|---|
| G4 | G5 | G6 | G7 | Ego Hand dataset |
| 0.9854 | 0.9889 | 0.9942 | 0.9915 | 0.9749 |
| 0.8616 | 0.8866 | 0.8548 | 0.8693 | 0.8267 |
| 0.9304 | 0.9364 | 0.9014 | 0.9124 | 0.9157 |

| Methods | Time in milliseconds | G1 | G2 | G3 |
|---|---|---|---|---|
| Conventional Technique 2 | 19000 | 0.9892 | 0.9901 | 0.9911 |
| Conventional Technique 1 and 3 | 24 | 0.8672 | 0.8495 | 0.8554 |
| Method of the Present disclosure | 36 | 0.9235 | 0.9128 | 0.9146 |

It can be seen from Table 1 that conventional technique 2 may have performed better than the system of the present disclosure because it employs deep features. Unfortunately, its applicability is restricted for gesture interaction on frugal HMD because such interactions require real-time processing which is not possible with conventional technique 2. Moreover, conventional technique 2 performs accurately only when the training and testing distributions are same and retraining the conventional technique 2 on different dataset is highly time consuming. It is to be observed from Table 1 that conventional technique 2 also takes more time for processing data (e.g., 19000 milliseconds). It is evident that the method of the present disclosure takes less time (e.g., 36 milliseconds) as compared to time taken by the conventional technique 2. It can also be observed from Table 1 that the method of the present disclosure requires more time computations than conventional technique 1 and conventional technique 3 (e.g., refer 'Shreyash Mohatta, Ramakrishna Perla, Gaurav Gupta, Ehtesham Hassan, and Ramya Hebbalaguppe, Robust hand gestural interaction for smartphone based AR/VR applications," in Applications of Computer Vision (WACV), 2017 IEEE Winter Conference on. IEEE, 2017, pp. 330-335.') but outperforms in terms of correct hand segmentation (e.g., refer results from Table 1 for G1-G7 associated with conventional technique 1, conventional technique 3 and the method of the present disclosure). It is because of the MOMF of the present disclosure that eventually leads to better hand segmentation.

Hand segmentation for frugal HMDs (e.g., Google Cardboard with a smartphone) was presented by the present disclosure. The underlying reason for implementing this feature by the systems and methods of the present disclosure is to enable the frugal headsets for AR applications like industrial inspection and tourism. The hand segmentation method of the present disclosure performs correctly on-device in real-time and that too without using any additional hardware such as depth and IR sensors. It is designed using CLAHE, Gaussian blur with the MOMF of the present disclosure. To evaluate the method of the present disclosure for hand segmentation, results of method of the present disclosure was compared with conventional techniques1 and 2 using Jaccard Index. It is observed that conventional technique 2 is not useful for real-time hand segmentation even though it provides better hand segmentation than the method of the present disclosure. Moreover, the method of the present disclosure performs significantly better hand segmentation than conventional technique 1 because of the MOMF of the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
    obtaining an input image comprising at least a hand and a background;
    pre-processing the input image to obtain a pre-processed image comprising a pre-processed hand and pre-processed background;
    applying a Multi Orientation Matched Filter (MOMF) on the pre-processed image to obtain a plurality of filter responses, wherein the MOMF is applied on the pre-processed image by rotating the MOMF at one or more predefined orientations for detecting a plurality of strong edges, and wherein the MOMF is designed to detect the plurality of strong edges which closely resembles a sigmoid function in a cross-sectional profile of the hand, while the MOMF detects the plurality of strong edges which resembles a line shaped pattern in a tangential profile of the hand;

merging the plurality of filter responses to obtain a merged filter response that comprises the plurality of strong edges and one or more weak edges;

filtering the one or more weak edges formed as one or more isolated blobs from the merged filter response to obtain a resultant edge map;

adding the resultant edge map to the pre-processed image to obtain a resultant image, wherein the resultant image comprises texture regions that are isolated from each other, wherein the resultant image comprises higher pixel values at locations of the plurality of strong edges and lie outside skin color range;

detecting, using one or more chroma channels, a plurality of skin pixels from the resultant image; and identifying a largest blob of skin pixels from the resultant image, wherein the largest blob of skin pixels is a segmented hand.

2. The processor implemented method of claim 1, wherein the step of pre-processing the input image comprises down-sampling the input image to obtain a down-sampled image and applying a Contrast Limited Local Histogram Equalization (CLAHE) technique on the down-sampled image to obtain the pre-processed image.

3. The processor implemented method of claim 1, wherein a plurality of weak edges are filtered during pre-processing of the input image by applying a Gaussian smoothing technique on the input image.

4. The processor implemented method of claim 1, wherein the one or more weak edges formed as one or more isolated blobs are filtered by applying a Morphological erosion technique on the merged filter response.

5. A system comprising:
a memory storing instructions;
one or more communication interfaces; and
one or more hardware processors coupled to the memory via the one or more communication interfaces, wherein the one or more hardware processors are configured by the instructions to:
obtain an input image comprising at least a hand and a background;
pre-process the input image to obtain a pre-processed image comprising a pre-processed hand and pre-processed background;
apply a Multi Orientation Matched Filter (MOMF) on the pre-processed image to obtain a plurality of filter responses, wherein the MOMF is applied on the pre-processed image by rotating the MOMF at one or more predefined orientations for detecting a plurality of strong edges, and wherein the MOMF is designed to detect the plurality of strong edges which closely resembles a sigmoid function in a cross-sectional profile of the hand, while the MOMF detects the plurality of strong edges which resembles a line shaped pattern in a tangential profile of the hand;
merge the plurality of filter responses to obtain a merged filter response that comprises the plurality of strong edges and one or more weak edges;
filter the one or more weak edges formed as one or more isolated blobs from the merged filter response to obtain a resultant edge map;
add the resultant edge map to the pre-processed image to obtain a resultant image, wherein the resultant image comprises texture regions that are isolated from each other, wherein the resultant image comprises higher pixel values at locations of the plurality of strong edges and lie outside skin color range;

detect, using one or more chroma channels, a plurality of skin pixels from the resultant image; and identify a largest blob of skin pixels from the resultant image, wherein the largest blob of skin pixels is a segmented hand.

6. The system of claim 5, wherein the input image is pre-processed by:
down-sampling the input image to obtain a down-sampled image; and
applying a Contrast Limited Local Histogram Equalization (CLAHE) technique on the down-sampled image to obtain the pre-processed image.

7. The system of claim 5, wherein a plurality of weak edges are filtered during pre-processing of the input image by applying a Gaussian smoothing technique on the input image.

8. The system of claim 5, wherein the one or more weak edges formed as one or more isolated blobs are filtered by applying a Morphological erosion technique on the merged filter response.

9. One or more non-transitory machine readable information storage mediums comprising one or more instructions which when executed by one or more hardware processors cause:
obtaining an input image comprising at least a hand and a background;
pre-processing the input image to obtain a pre-processed image comprising a pre-processed hand and pre-processed background;
applying a Multi Orientation Matched Filter (MOMF) on the pre-processed image to obtain a plurality of filter responses, wherein the MOMF is applied on the pre-processed image by rotating the MOMF at one or more predefined orientations for detecting a plurality of strong edges, and wherein the MOMF is designed to detect the plurality of strong edges which closely resembles a sigmoid function in a cross-sectional profile of the hand, while the MOMF detects the plurality of strong edges which resembles a line shaped pattern in a tangential profile of the hand;
merging the plurality of filter responses to obtain a merged filter response that comprises the plurality of strong edges and one or more weak edges;
filtering the one or more weak edges formed as one or more isolated blobs from the merged filter response to obtain a resultant edge map;
adding the resultant edge map to the pre-processed image to obtain a resultant image, wherein the resultant image comprises texture regions that are isolated from each other, wherein the resultant image comprises higher pixel values at locations of the plurality of strong edges and lie outside skin color range;
detecting, using one or more chroma channels, a plurality of skin pixels from the resultant image; and
identifying a largest blob of skin pixels from the resultant image, wherein the largest blob of skin pixels is a segmented hand.

10. The one or more non-transitory machine readable information storage mediums of claim 9, wherein the step of pre-processing the input image comprises down-sampling the input image to obtain a down-sampled image and applying a Contrast Limited Local Histogram Equalization (CLAHE) technique on the down-sampled image to obtain the pre-processed image.

11. The one or more non-transitory machine readable information storage mediums of claim 9, wherein a plurality of weak edges are filtered during pre-processing of the input image by applying a Gaussian smoothing technique on the input image.

12. The one or more non-transitory machine readable information storage mediums of claim 9, wherein the one or more weak edges formed as one or more isolated blobs are filtered by applying a Morphological erosion technique on the merged filter response.

* * * * *